(12) United States Patent
Rothe

(10) Patent No.: US 10,384,526 B2
(45) Date of Patent: Aug. 20, 2019

(54) DRIVE DEVICE FOR A MOTOR VEHICLE

(71) Applicant: AUDI AG, Ingolstadt (DE)

(72) Inventor: Albrecht Rothe, Ingolstadt (DE)

(73) Assignee: Audi AG, Ingolstadt (DE)

( * ) Notice: Subject to any disclaimer, the term of this patent is extended or adjusted under 35 U.S.C. 154(b) by 75 days.

(21) Appl. No.: 15/420,851

(22) Filed: Jan. 31, 2017

(65) Prior Publication Data

US 2017/0217300 A1   Aug. 3, 2017

(30) Foreign Application Priority Data

Feb. 3, 2016   (DE) .................. 10 2016 001 199

(51) Int. Cl.

| B60K 6/387 | (2007.10) |
|---|---|
| F16D 13/76 | (2006.01) |
| B60K 6/40 | (2007.10) |
| B60K 6/48 | (2007.10) |
| B60K 6/405 | (2007.10) |
| B60K 6/383 | (2007.10) |

(52) U.S. Cl.
CPC ............... *B60K 6/387* (2013.01); *B60K 6/40* (2013.01); *B60K 6/48* (2013.01); *F16D 13/76* (2013.01); *B60K 6/383* (2013.01); *B60K 6/405* (2013.01); *B60K 2006/4825* (2013.01); *B60K 2006/4833* (2013.01); *B60Y 2200/92* (2013.01); *B60Y 2400/424* (2013.01); *B60Y 2400/48* (2013.01); *Y02T 10/6221* (2013.01); *Y02T 10/6252* (2013.01); *Y10S 903/914* (2013.01)

(58) Field of Classification Search
None
See application file for complete search history.

(56) References Cited

U.S. PATENT DOCUMENTS 6,254,507 B1 * 7/2001 Downs .................. B60K 6/383
                                                                   477/4
7,261,665 B2   8/2007 Friedmann
(Continued)

FOREIGN PATENT DOCUMENTS

| AT | 511 632 A1 | 1/2013 |
|---|---|---|
| CN | 103415411 A | 11/2013 |

(Continued)

OTHER PUBLICATIONS

European Search Report dated Jun. 2, 2017 with respect to counterpart European patent application EP 16 20 6051.

(Continued)

*Primary Examiner* — Mark A Manley
(74) *Attorney, Agent, or Firm* — Henry M. Feiereisen LLC

(57) ABSTRACT

A drive device for a motor vehicle includes a first drive unit having a driveshaft, a multi-speed transmission having an input shaft, and a vibration damper. A clutch includes a first clutch member which is coupled to the input shaft of the multi-speed transmission, and a second clutch member which is coupled to the first drive unit via the vibration damper to thereby operably connect the first drive unit with the multi-speed transmission via the vibration damper and the clutch. A second drive unit includes a driveshaft which is arranged in axis-parallel or coaxial relationship to the first drive unit. The second drive unit is coupled to the first clutch member of the clutch.

7 Claims, 2 Drawing Sheets

(56) References Cited

U.S. PATENT DOCUMENTS

| | | | |
|---|---|---|---|
| 2006/0108162 A1* | 5/2006 | Tabata | B60K 6/26 |
| | | | 180/65.23 |
| 2007/0289833 A1 | 12/2007 | Chapelon | |
| 2008/0023287 A1 | 1/2008 | Thiede | |
| 2009/0105040 A1 | 4/2009 | Sanji | |
| 2011/0124455 A1* | 5/2011 | Borntraeger | B60K 6/365 |
| | | | 475/5 |
| 2012/0080286 A1* | 4/2012 | Kasuya | B60K 6/40 |
| | | | 192/113.3 |
| 2012/0242199 A1 | 9/2012 | Iwase et al. | |
| 2013/0109524 A1 | 5/2013 | Kaltenbach | |
| 2015/0033889 A1* | 2/2015 | Shibata | F16H 57/029 |
| | | | 74/421 A |
| 2015/0119193 A1 | 4/2015 | Kim | |

FOREIGN PATENT DOCUMENTS

| | | |
|---|---|---|
| CN | 104210348 A | 12/2014 |
| CN | 104797448 A | 7/2015 |
| DE | 199 41 705 | 3/2000 |
| DE | 10 2006 034 945 A1 | 4/2008 |
| DE | 10 2008 040 494 | 1/2010 |
| DE | 10 2009 013 945 | 9/2010 |
| DE | 10 2011 085 201 A1 | 5/2013 |
| EP | 2 886 383 | 6/2015 |
| FR | 04 06029 | 9/2005 |
| WO | 2013/125581 * | 8/2013 |

OTHER PUBLICATIONS

Translation of European Search Report dated Jun. 2, 2017 with respect to counterpart European patent application EP 16 20 6051.

Chinese Search Report dated Sep. 21, 2018 with respect to counterpart Chinese patent application 2017100609634.

Translation of Chinese Search Report dated Sep. 21, 2018 with respect to counterpart Chinese patent application 2017100609634.

* cited by examiner

DRIVE DEVICE FOR A MOTOR VEHICLE

CROSS-REFERENCES TO RELATED APPLICATIONS

This application claims the priority of German Patent Application, Serial No. 10 2016 001 199.8, filed Feb. 3, 2016, pursuant to 35 U.S.C. 119(a)-(d), the disclosure of which is incorporated herein by reference in its entirety as if fully set forth herein.

BACKGROUND OF THE INVENTION

The present invention relates to a drive device for a motor vehicle.

The following discussion of related art is provided to assist the reader in understanding the advantages of the invention, and is not to be construed as an admission that this related art is prior art to this invention.

A drive device of a type involved here is used to propel a motor vehicle and thus to provide a torque that propels the motor vehicle. The drive device can include several drive units, normally two drive units that can be of different type, e.g. an internal combustion engine and an electric machine. In this case, a hybrid drive is involved. Still, the drive units may, of course, also be of a same type, i.e. as internal combustion engines or electric machines. The drive units have normally each a drive shaft via which the generated torque is provided.

It would be desirable and advantageous to provide an improved drive device which obviates prior art shortcomings and which is compact in structure and thus space-saving and yet reliable in operation.

SUMMARY OF THE INVENTION

According to one aspect of the present invention, a drive device for a motor vehicle includes a first drive unit including a driveshaft, a multi-speed transmission including an input shaft, a vibration damper, a clutch including a first clutch member coupled to the input shaft of the multi-speed transmission, and a second clutch member coupled to the first drive unit via the vibration damper to thereby operably connect the first drive unit with the multi-speed transmission via the vibration damper and the clutch, and a second drive unit including a driveshaft arranged in axis-parallel or coaxial relationship to the first drive unit, the second drive unit being coupled to the first clutch member of the clutch.

A drive device according to the present invention includes a multi-speed transmission that enables a shift to different speed ratios. The multi-speed transmission may be configured as a manual transmission or also automatic transmission. The term "manual transmission" relates hereby to a manually operated transmission or to a manual transmission that at least may be operated in part automatically, e.g. dual clutch transmission. The term "automatic transmission" relates primarily to a torque-converter transmission. Of course, the multi-speed transmission may also be configured as continuously variable transmission or the like.

The multi-speed transmission is advantageously operably connected between the first drive unit and/or the second drive unit, on one hand, and an output shaft of the drive device, on the other hand. As a result, the multi-speed transmission can be used to set the speed ratio between the first drive unit and/or the second drive unit, on one hand, and the output shaft of the drive device, on the other hand.

The first drive unit is operably connected with the multi-speed transmission via the vibration damper and the clutch. The vibration damper may be designated as torsional vibration damper or torsional coupling and is provided to dampen vibrations or torsional vibrations of the first drive unit, so that vibrations are not transmitted or at least transmitted in dampened form to the multi-speed transmission.

The presence of the clutch enables the drive device to make or break an interaction between the first drive unit and the multi-speed transmission. Thus, in a first shifting mode of the clutch, the interaction between the first drive unit and the multi-speed transmission is cut, whereas in a second shifting mode of the clutch, the interaction between the first drive unit and the multi-speed transmission is fully established, or at least established in part. In the second shifting mode, the first drive unit and its driveshaft are advantageously operably connected to the multi-speed transmission.

The sequence of positioning of the vibration damper and the clutch within the interaction between the first drive unit and the multi-speed transmission can be chosen randomly. Currently preferred is, however, an arrangement in which the vibration damper is located between the first drive unit and the clutch, i.e. the clutch is operably connected with the first drive unit via the vibration damper.

The clutch can be comprised of several parts and includes at least the first and second clutch members. In a first shifting mode or first shifting position of the clutch, the first and second clutch members are decoupled from one another, so that the clutch is disengaged and thus no torque is transmitted between the first drive unit and the multi-speed transmission. Conversely, in a second shifting mode or shifting position, the first and second clutch members are operably connected to one another, so that a torque or at least part of the torque is transmitted between the first drive unit and the multi-speed transmission. Advantageously, the first and second clutch members are coupled in fixed rotative engagement with one another for transmission of at least a torque acting between the first drive unit and the multi-speed transmission and ranging within a normal torque range of the drive device.

The first clutch member of the clutch can be directly coupled with the input shaft of the multi-speed transmission, advantageously connected rigidly and permanently. For example, the first clutch member can be arranged directly on the input shaft of the multi-speed transmission and connected to the input shaft. Conversely, the second clutch member of the clutch is coupled or operably connected via the vibration damper with the first drive unit or its driveshaft. As a result, the first drive unit is operably connected with the second clutch member via the vibration damper. Advantageously, this interaction is also permanent, although normally not rigid in view of the presence of the vibration damper.

The clutch may be configured as disc clutch, having discs that can extend from the second clutch member in a radial direction relative to a rotation axis of the second clutch member to the outside to thereby engage between discs arranged on the first clutch member and extending from the first clutch member inwardly in the radial direction. The discs of the second clutch member and the discs of the first clutch member engage in the radial direction between one another. Viewed in an axial direction, the second clutch member and the first clutch member overlap each other at least in part. For example, the second clutch member engages the first clutch member. The first clutch member may hereby represent an outer carrier and the second clutch member may represent an inner carrier.

In the first shifting mode of the clutch, the discs of the first and second clutch members are arranged in spaced-apart relation, in particular in axial spaced-apart relation, so that the first clutch member and the second clutch member are decoupled from one another. In the second shifting mode, the discs of the first clutch member rest upon the discs of the second clutch member so as to establish a forced engagement between the first and second clutch members. For example, the first clutch member can be moved in the axial direction to distance the discs in the first shifting mode from one another and to operably connect them in the second shifting mode.

Of course, the clutch may be configured in any suitable manner, for example as a friction clutch or as an interlocking clutch. An example for a friction clutch includes the afore-mentioned disc clutch. In a configuration of a disc clutch as interlocking clutch, a claw-type clutch can be involved for example. There is no need for configuring the clutch as manually operable or actuatable clutch. Automatic shifting may also be provided. However, a clutch according to the invention has advantageously at least two shifting modes or shifting positions. As such, the clutch can be configured as override clutch or freewheel, in which the shifting mode depends on the relative speed between the clutch members or the rotation directions of the first and second clutch members.

The first and second drive units are arranged in axis-parallel or coaxial relation. This means, that the driveshaft of the first drive unit or the rotation axis thereof is arranged in parallel relation to the driveshaft of the second drive unit or rotation axis thereof. Such an arrangement of the first and second drive units results in an optimal use of the available installation space in an engine compartment in which the drive device is to be installed. In addition, the attachment of the drive units to further components of the drive device, e.g. multi-speed transmission, is simplified.

The axis-parallel arrangement involves a parallel spaced-apart disposition of the driveshafts or their rotation axes, whereas a coaxial arrangement involves a coincidence of the rotation axes of the driveshafts of the first and second drive units, i.e. the driveshafts are identical. For example, in the coaxial arrangement, the second drive unit can be arranged, as viewed in the axial direction, between the vibration damper and the multi-speed transmission.

The term "axis-parallel" of the first and second drive units relates in the description to a parallel arrangement of the respective driveshafts at least when viewed in a plan view upon the drive device. Thus, in a general embodiment of an axis-parallel arrangement, the driveshafts are not, in fact, arranged axis-parallel but appear only in a plan view in parallel relation. In other words, the driveshafts of the drive units are arranged skewed in relation to one another, but arranged in imaginary planes that are arranged parallel to one another.

A rotation axis of the driveshaft of the first drive unit is thus arranged in a first plane and a rotation axis of the driveshaft of the second drive unit is arranged in a second plane, with the first and second planes extending in parallel relationship. Still, the rotation axes are aligned such as to be skewed relative to one another.

Advantageously, the driveshafts of the drive units or their rotation axes may, however, be arranged in relation to one another three-dimensionally axis-parallel, i.e. axis-parallel in its ordinary meaning. This is generally the meaning in the description, unless described expressly otherwise. For example, the driveshafts are thus arranged also parallel in a longitudinal axis of the motor vehicle.

Provision may be made for positioning the first and second drive units side-by-side. This means in respect to their driveshafts or their rotation axes that the drive units overlap one another in the axial direction. The first and second drive shafts should thus not be spaced from one another in the axial direction but rather arranged adjacent to one another at at least one axial position. Advantageously, the smaller one of the first and second drive units, as viewed in the axial direction, is fully spanned by the greater one of the first and second drive units, as viewed in the axial direction. For example, the second drive unit may be smaller in the axial direction than the first drive unit.

The afore-described arrangement of the first and second drive units is advantageously realized, when installed, i.e. the final arrangement of the first and second drive units after installation of the drive device or production of the motor vehicle. The installation position is thus also established when the motor vehicle is in motion, during which the first drive unit and/or the second drive unit generate(s) the propulsion power for propelling the motor vehicle.

According to another advantageous feature of the present invention, the second drive unit can be coupled to the first clutch member of the clutch. Advantageously, the connection between the second drive unit and the first clutch member may be rigid and/or permanent. For example, the second drive unit engages directly the first clutch member. The first clutch member may hereby be formed directly by the driveshaft of the second drive unit, or vice versa. Advantageously, this type of configuration finds application, when the drive units are arranged in coaxial relation. Coupling between the second drive unit and the first clutch member may, however, also be realized via at least one gear stage of the multi-speed transmission, in particular when the drive units are arranged axis-parallel to one another.

The attachment of the second drive unit to the multi-speed transmission may be realized via the gear stage. More specifically, the gear stage couples the second drive unit and the first clutch member of the clutch, as described above. A rigid and/or permanent interaction can be established via the gear stage between the second drive unit and the first clutch member. Thus, the interaction between the second drive unit and the multi-speed transmission is permanent, with the interaction being established via the first clutch member of the clutch and, optionally, via the gear stage.

Advantageously, the gear stage may be realized in the form of a gearwheel stage. Of course, the transmission or the gear stage may be configured in any appropriate manner, e.g. as wheel gear mechanism or as belt gear mechanism. Currently preferred, however, is a construction as interlocking interaction that can be realized by configuring the gear stage as gearwheel stage. The gearwheel stage includes several gearwheels, of which adjacent two of the gearwheels mesh or engage one another.

Advantageously, the first and second drive units rotate in a same direction, when the input shaft assumes a specific rotation direction. The gear stage can be constructed correspondingly. Thus, the gear stage is configured to maintain the rotation direction and, for this purpose, includes, e.g., an odd number of gearwheels, i.e. at least three gearwheels.

According to another advantageous feature of the present invention, the clutch can be arranged in a transmission case of the multi-speed transmission. In this way, the degree of integration is high and the drive device requires little space. The transmission case is provided to primarily receive the transmission elements of the multi-speed transmission, i.e. at least one set of gearwheels or a set of planetary wheels for example. The clutch may also be arranged in the transmission case, so that the clutch is integrated in the multi-speed transmission.

According to another advantageous feature of the present invention, the first clutch member can have outer teeth which can form part of the at least one gear stage. At least one wheel or gearwheel of the gear stage thus engages directly the first clutch member and is in mesh with the outer teeth of the first clutch member. Advantageously, the outer teeth are configured in one piece with and/or of same material as the first clutch member. Provision may, however, also be made to produce the outer teeth separate from the first clutch member and then to secure the outer teeth to the first clutch member. In any event, the outer teeth are in fixed rotative engagement with the first clutch member.

According to another advantageous feature of the present invention, the drive device can include a hollow shaft and a coupling shaft which is arranged in the hollow shaft and connects the vibration damper with the second clutch member, with the first clutch member being coupled to the second drive unit via the hollow shaft. The hollow shaft establishes the interaction between the first clutch member and the second drive unit. For example, the hollow shaft can extend from the first clutch member in the axial direction towards the first drive unit and/or the second drive unit.

In addition, or as an alternative, the hollow shaft can extend from the first clutch member in a direction facing away of the multi-speed transmission. The hollow shaft is provided to receive at least part of the coupling shaft. The coupling shaft establishes an interaction of the vibration damper with the second clutch member, suitably rigid and/or permanent. Currently preferred is a configuration in which the coupling shaft extends in its entirety through the hollow shaft in the axial direction.

According to another advantageous feature of the present invention, the input shaft can be arranged in coaxial relationship with at least one member selected from the group consisting of the first driveshaft, the hollow shaft, and the coupling shaft. One shaft or several shafts, as selected from the first driveshaft, the hollow shaft, and the coupling shaft, extend(s) coaxially in relation to the input shaft. Such a construction also results in a compact and space-saving configuration of the drive device.

According to another advantageous feature of the present invention, a bearing can be provided to support the coupling shaft upon the hollow shaft. The bearing can thus be located between the coupling shaft and the hollow shaft. Currently preferred is a support of the coupling shaft via the bearing within the hollow shaft. In this way, the bearing rests, as viewed in the radial direction, on the inside upon the coupling shaft or upon an outer circumference of the coupling shaft, and, as viewed in the radial direction on the outside upon the hollow shaft or upon an inner circumference of the hollow shaft. Advantageously, provision may be made for several bearings arranged in axial spaced-apart relationship.

According to another advantageous feature of the present invention, a gearwheel can be arranged on the hollow shaft and can form part of the at least one gear stage. The gearwheel may be part of the hollow shaft and thus configured in one piece with and/or of same material as the hollow shaft. As an alternative, the gearwheel may also be configured separate from the hollow shaft and secured to the hollow shaft. The gearwheel forms part of the gear stage, so that the second drive unit is thus coupled to the first clutch member of the clutch and in turn via the first clutch member with the multi-speed transmission, especially in a rigid and/or permanent manner.

According to another advantageous feature of the present invention, the gearwheel can be arranged outside of the transmission case. As described above, the clutch may advantageously be integrated in the transmission case. Thus, provision can be made for the hollow shaft to extend out of the transmission case, so that the gearwheel is located outside of the transmission case. In this way, the multi-speed transmission can be encapsulated in a reliable manner.

According to another advantageous feature of the present invention, the first clutch member can be configured for axial movement so as to actuate the clutch. This configuration finds application in particular, when the clutch is configured as disc clutch. In the first shifting mode of the clutch, the first clutch member is thus arranged in a first axial position and in a second shifting mode in a second axial position. When provided, the hollow shaft can be shifted together with the first clutch member in the axial direction. The gear stage may hereby, advantageously, be configured such as to compensate a misalignment of the hollow shaft in axial direction during shift. The gearwheels of the gear stage may be defined by a width sufficient to ensure engagement with one another in any position of the first clutch member.

According to another advantageous feature of the present invention, the first drive unit can be configured as an internal combustion engine and/or the second drive unit can be configured as an electric machine. Thus, the drive device may be configured as a hybrid drive device, as described above.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
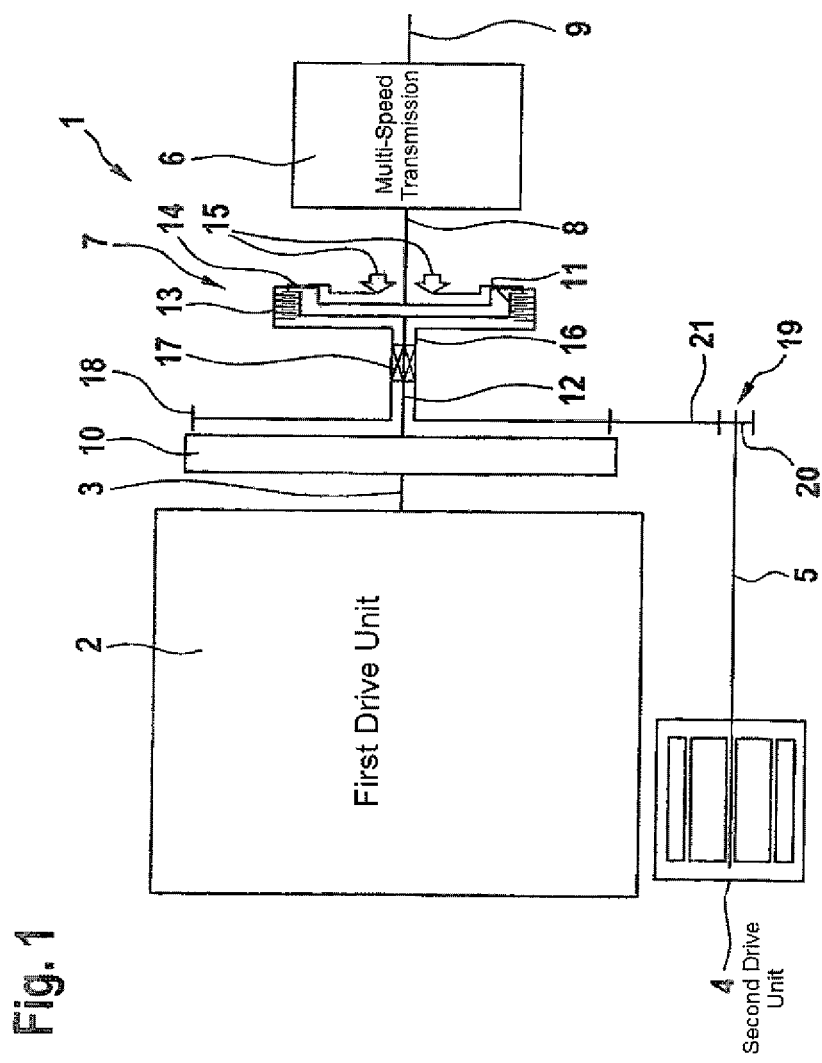
FIG. 1 is a schematic illustration of a first embodiment of a drive device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a first embodiment of a drive device according to the present invention, generally designated by reference numeral 1, for propulsion of a motor vehicle for example. The drive device 1 includes a first drive unit 2 having a first driveshaft 3, and a second drive unit 4 having a second driveshaft 5. The first drive unit 2 is configured as internal combustion engine and the second drive unit 4 is configured as electric machine. The second drive unit 4 is arranged axis-parallel to the first drive unit 2, in particular arranged next to the first drive unit 2. This means, that the drive units 2, 4 are positioned in an axial direction in relation to their driveshafts 3, 5 at least in part in overlapping relation, advantageously in complete overlapping relation. As an alternative, the drive units 2, 4 may also be arranged in coaxial relation.

The drive device 1 includes a multi-speed transmission 6 and a clutch 7. The multi-speed transmission 6 has an input shaft 8 and an output shaft 9. Different speed ratios between the input shaft 8 and the output shaft 9 can be adjusted by the multi-speed transmission 6.

The driveshaft 3 is connected at its end distal to the first drive unit 2 with an inlet side of a vibration damper 10. On its side distal to the first drive unit 2 or driveshaft 3, i.e. on the output side, the vibration damper 10 is operably connected with an inner carrier 11 of the clutch 7, advantageously in a rigid and/or permanent manner. The inner carrier 11 may also represent a second clutch member 11. The interaction between the vibration damper 10 and the inner carrier 11 is realized via a coupling shaft 12 for example.

An outer carrier 13 of the clutch 7, representing a first clutch member 13, is operably connected with the multi-speed transmission 6 and the input shaft thereof, advantageously in a rigid and/or permanent manner. The clutch 7 can be advantageously configured as disc clutch and thus has discs which extend from the inner carrier 11 and the outer carrier 13 and engage between one another. For example, by axially shifting the outer carrier 13 with the assistance of an actuator 14, the clutch 7 can be closed, so that the discs interact through forced engagement to thereby establish an interaction between the inner carrier 11 and the outer carrier 13. The shift of the outer carrier 13 is indicated by arrows 15. As is readily apparent, the input shaft 8 is arranged in coaxial relation to the coupling shaft 12 and the first driveshaft 3. The clutch 7 is advantageously arranged in the axial direction between the first drive unit 2 and the multi-speed transmission 6.

As shown in FIG. 1, provision is made for a hollow shaft 16 which is connected to the outer carrier 13, with the connection being realized advantageously in a rigid and/or permanent manner. Arranged in the hollow shaft 16 is at least one region of the coupling shaft 12. Advantageously, the coupling shaft 12 extends through the hollow shaft 16 in the axial direction. In addition, provision may be made to mount the coupling shaft 12 in or on the hollow shaft 16. For this purpose, a bearing 17 is provided which rests in a radial direction on the inside upon an outer circumference of the coupling shaft 12 and on the outside upon an inner circumference of the hollow shaft 16 to thereby support the coupling shaft 12 in the radial direction in relation to the hollow shaft 16.

Arranged and secured to the hollow shaft 16 is a gearwheel 18 which forms part of a gear stage 19. The second drive unit 4 is operably connected via the gear stage 19 with the outer carrier 13 and via the outer carrier 13 with the multi-speed transmission 6 and the driveshaft 8 thereof, advantageously in a rigid and/or permanent manner. The gear stage 19 includes a gearwheel 20 which is connected to the driveshaft 5. Advantageously, the gearwheel 20 is arranged on the driveshaft 5. The gearwheels 18, 20 are operably connected to one another via an intermediate gearwheel 21 which is in mesh with the gearwheel 20 and with the gearwheel 18.

Figure 2:
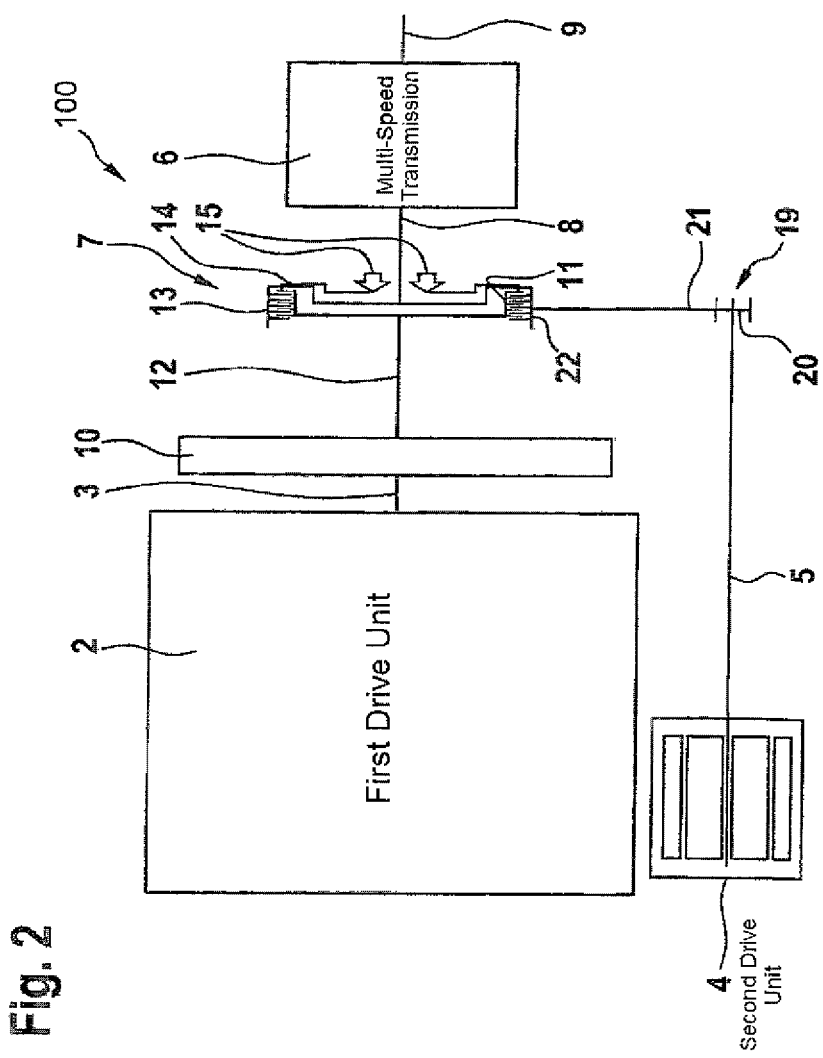
FIG. 2 is a schematic illustration of a second embodiment of a drive device according to the present invention.

FIG. 2 shows a schematic illustration of a second embodiment of a drive device according to the present invention, generally designated by reference numeral 100. Parts corresponding with those in FIG. 1 are denoted by identical reference numerals and not explained again. The description below will center on the differences between the embodiments. The drive device 100 of FIG. 2 is characterized by the absence of hollow shaft 16, bearing 17, and gearwheel 18. Rather, the drive device 100 includes an outer carrier 13 which is provided with outer teeth 22 that form part of the gear stage 19. For this purpose, the intermediate gearwheel 21 is in mesh with the gearwheel 20 and the outer teeth 22, so that the gear stage 19 establishes an interaction between the second drive unit 4 and the outer carrier 13 and thus with the multi-speed transmission 6. Such a configuration of the drive device 100 requires even less installation space.

Common to both embodiments of the drive device 1, 100 is the compact structure and thus the need for little installation space. This can be realized in particular as a result of the axis-parallel or coaxial arrangement of the first drive unit 2 and the second drive unit 4, so that both drive units 2, 4 can be operably connected to the multi-speed transmission 6 in a simple manner. The interaction between the first drive unit 2 and the multi-speed transmission 6 is realized via the clutch 7 and can be selectively cut or established. The first drive unit 2 can be decoupled from the multi-speed transmission 6 in a first shifting mode of the clutch 7, and coupled in a second shifting mode of the clutch 7 to realize the interaction between the first drive unit 2 and the multi-speed transmission 6. Conversely, the second drive unit 4 is operably connected permanently with the multi-speed transmission.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A drive device for a motor vehicle, said drive device comprising:
   a first drive unit including a driveshaft;
   a multi-speed transmission including an input shaft;
   a vibration damper;
   a clutch including a first clutch member coupled to the input shaft of the multi-speed transmission, and a second clutch member coupled to the first drive unit via the vibration damper to thereby operably connect the first drive unit with the multi-speed transmission via the vibration damper and the clutch;
   a second drive unit including a driveshaft arranged in axis-parallel relationship to the first drive unit, said second drive unit being coupled to the first clutch member of the clutch;
   wherein the first drive unit and the second drive unit are spaced from each other in a transverse direction and extend in an axial direction at least partially over a same axial location before the vibration damper at one axial side of the vibration damper; and
   wherein the first driveshaft and the second driveshaft are spaced from each other in the transverse direction and extend in the axial direction at least partially over a same axial location before the vibration damper, with the first driveshaft extending continuously without intermediate elements to a location at the one axial side of the vibration damper and with the second drive shaft extending continuously without intermediate elements first at the one axial side before the vibration damper and then to a location at an opposite axial side of the vibration damper, wherein the multi-speed transmission includes a transmission case, said clutch being arranged in the transmission case of the multi-speed transmission; and a hollow shaft and a coupling shaft which is arranged in the hollow shaft and connects the vibration damper with the second clutch member, said first clutch member being coupled to the second drive unit via the hollow shaft, wherein the second drive unit is coupled to the first clutch member of the clutch via at least one near stage of the multi-speed transmission, and further comprising a gearwheel arranged on the hollow shaft and forming part of the at least one gear stage, said gearwheel being arranged outside of the transmission case.

2. The drive device of claim 1, wherein the first clutch member has outer teeth which form part of the at least one gear stage.

3. The drive device of claim 1, wherein the input shaft is arranged in coaxial relationship with at least one member selected from the group consisting of the first driveshaft, hollow shaft, and the coupling shaft.

4. The drive device of claim 1, further comprising a bearing configured to support the coupling shaft upon the hollow shaft.

5. The drive device of claim 1, wherein the first clutch member is configured for axial movement so as to actuate the clutch.

6. The drive device of claim 1, wherein the first drive unit is configured as an internal combustion engine.

7. The drive device of claim 1, wherein the second drive unit is configured as an electric machine.

* * * * *

UNITED STATES PATENT AND TRADEMARK OFFICE
CERTIFICATE OF CORRECTION

PATENT NO. : 10,384,526 B2  
APPLICATION NO. : 15/420851  
DATED : August 20, 2019  
INVENTOR(S) : Albrecht Rothe Page 1 of 1

It is certified that error appears in the above-identified patent and that said Letters Patent is hereby corrected as shown below:

In the Claims

In Column 9, Claim 1, Line 16:
Replace "near stage" with --gear stage--

Signed and Sealed this
Twelfth Day of November, 2019

Andrei Iancu
*Director of the United States Patent and Trademark Office*